(12) United States Patent
Maruyama et al.

(10) Patent No.: US 11,390,297 B2
(45) Date of Patent: Jul. 19, 2022

(54) RECOGNITION DEVICE, RECOGNITION METHOD, AND STORAGE MEDIUM

(71) Applicant: HONDA MOTOR CO., LTD., Tokyo (JP)

(72) Inventors: Masaki Maruyama, Wako (JP); Minoru Higuchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 102 days.

(21) Appl. No.: 16/884,105

(22) Filed: May 27, 2020

(65) Prior Publication Data

US 2020/0385012 A1 Dec. 10, 2020

(30) Foreign Application Priority Data

Jun. 7, 2019 (JP) .............................. JP2019-107386

(51) Int. Cl.
  *B60W 50/14* (2020.01)
  *G06V 20/56* (2022.01)
  *G06V 20/59* (2022.01)

(52) U.S. Cl.
  CPC ............. *B60W 50/14* (2013.01); *G06V 20/56* (2022.01); *G06V 20/597* (2022.01); *B60W 2540/225* (2020.02); *B60W 2554/4048* (2020.02)

(58) Field of Classification Search
  CPC ........... B60W 50/14; B60W 2540/225; B60W 2554/4048; G06K 9/00791;
  (Continued)

(56) References Cited

U.S. PATENT DOCUMENTS 9,487,139 B1 * 11/2016 Ishida .................. B60W 30/08
10,430,695 B2 * 10/2019 Sathyanarayana ..... G05D 1/021
(Continued)

FOREIGN PATENT DOCUMENTS

| JP | 2001-357498 | 12/2001 |
| JP | 2010-105502 | 5/2010 |
| JP | 2014-120114 | 6/2014 |

OTHER PUBLICATIONS

Japanese Office Action for Japanese Patent Application No. 2019-107386 dated May 24, 2022.

*Primary Examiner* — Omar Casillashernandez
(74) *Attorney, Agent, or Firm* — Amin, Turocy & Watson, LLP

(57) ABSTRACT

A recognition device includes a processor and a memory storing program instructions executable by the processor. The processor is configured to recognize a visual field range which extends from a viewpoint of a driver of a moving object in a line-of-sight direction and extends at a predetermined angle as moving away from the viewpoint with reference to a detection result of a line-of-sight detection device, recognize a target present in a surrounding environment of the moving object shown within image data on the basis of the image data in which surroundings of the moving object are imaged by a visual sensor disposed in the moving object and set an area of the recognized target in a predetermined shape, and set a plurality of determination points in the area of the target and determine whether or not the driver is recognizing the target on the basis of a degree of overlap between the plurality of determination points and the visual field range.

13 Claims, 10 Drawing Sheets

(58) Field of Classification Search
CPC ........... G06K 9/00845; G06K 9/00221; G06K 9/00805; G08G 1/165; G08G 1/166
USPC ..................................................... 340/425.5
See application file for complete search history.

(56) References Cited

U.S. PATENT DOCUMENTS

| | | | |
|---|---|---|---|
| 2007/0106475 A1* | 5/2007 | Kondoh ............. | G06K 9/00805 701/301 |
| 2009/0237269 A1* | 9/2009 | Okugi .................... | G08G 1/166 340/901 |
| 2012/0320207 A1* | 12/2012 | Toyofuku ................ | G02B 27/01 348/148 |
| 2016/0018889 A1* | 1/2016 | Skogo .................. | G06K 9/2018 348/78 |
| 2016/0078305 A1* | 3/2016 | Higgins-Luthman .... | H04N 7/18 348/118 |
| 2018/0126901 A1* | 5/2018 | Levkova ............ | G06K 9/00597 |
| 2018/0264940 A1* | 9/2018 | Torii .................. | G06K 9/00845 |

* cited by examiner

RECOGNITION DEVICE, RECOGNITION METHOD, AND STORAGE MEDIUM

CROSS-REFERENCE TO RELATED APPLICATION

Priority is claimed on Japanese Patent Application No. 2019-107386, filed Jun. 7, 2019, the content of which is incorporated herein by reference.

BACKGROUND

Field of the Invention

The present invention relates to a recognition device, a recognition method, and a storage medium.

Description of Related Art

A travel assistance system configured to detect a line-of-sight position, a line-of-sight circle, and a visual field area of a driver from a captured image captured by a driver camera, detect a feature object present in front of a vehicle in a traveling direction from a captured image captured by a front camera, identify a visual recognition form of the driver for the feature object on the basis of an overlapping form between the feature object and the line-of-sight circle, and provide guidance related to the feature object on the basis of the identified visual recognition form has been disclosed (for example, Japanese Unexamined Patent Application, First Publication No. 2014-120114).

SUMMARY

In the technology in the related art, the processing load for obtaining a degree of overlap between an area of a feature object and an area of a line-of-sight circle of a driver is high.

The present invention has been made on the basis of recognition of the above-described problem and an objective of the present invention is to provide a recognition device, a recognition method, and a storage medium capable of determining whether or not a driver is recognizing a target in a traveling direction of a moving object with a low load.

A recognition device, a recognition method, and a storage medium according to the present invention adopt the following configurations.

(1): According to an aspect of the present invention, there is provided a recognition device including a processor and a memory storing program instructions executable by the processor. The processor is configured to recognize a visual field range which extends from a viewpoint of a driver of a moving object in a line-of-sight direction and extends at a predetermined angle as moving away from the viewpoint with reference to a detection result of a line-of-sight detection device, recognize a target present in a surrounding environment of the moving object shown within image data on the basis of the image data in which surroundings of the moving object are imaged by a visual sensor disposed in the moving object and set an area of the recognized target in a predetermined shape, and set a plurality of determination points in the area of the target and determine whether or not the driver is recognizing the target on the basis of a degree of overlap between the plurality of determination points and the visual field range.

(2): In the above-described aspect (1), the plurality of determination points include at least a center point of the area of the target and a nearest point and a farthest point between a point projected on the image data in the line-of-sight direction or a linear line in the line-of-sight direction and the area of the target.

(3): In the above-described aspect (2), the predetermined shape is a rectangular parallelepiped shape centered on the target.

(4): In the above-described aspect (3), the processor is configured to project the visual field range onto an image plane represented by the image data and determine whether or not the driver is recognizing the target on the basis of a degree of overlap between the projected visual field range and the plurality of determination points.

(5): In the above-described aspect (4), the processor is configured to change the number of determination points located in the visual field range on the basis of an attribute of the target, the number of determination points being a reference when it is determined that the driver is recognizing the target.

(6): In the above-described aspect (5), the processor is configured to determine that the driver is recognizing the target including the determination points in a case where the determination points, the number of which is equal to the number that is the reference, are located in the visual field range for more than a predetermined time period.

(7): In the above-described aspect (6), the predetermined time period is a time period obtained by summing a plurality of time periods in which the determination points, the number of which is equal to the number that is the reference, are located in the visual field range within a predetermined interval.

(8): In the above-described aspect (6), the processor is configured to change the predetermined time period on the basis of the attribute of the target.

(9): In the above-described aspect (8), the processor is configured to determine whether the driver is partially recognizing the target or the driver is recognizing the target in accordance with a length of time during which the determination points are located within the visual field range, cause a notification device to perform a notification in a first form of the presence of the target determined not to be recognized by the driver, and cause the notification device to perform a notification in a second form of the presence of the target determined to be partially recognized by the driver.

(10): In the above-described aspect (9), the processor is configured to cause the notification device to end the notification related to the target in a case where the driver is recognizing the target for which the notification of the presence thereof has been provided.

(11): In the above-described aspect (1), the processor is configured to assign a recognition state of the driver to each target, record the assigned recognition state for a predetermined time period, and determine that recognition of the target to which the recognition state is assigned is in progress in a case where there are a plurality of targets in the visual field range.

(12): According to an aspect of the present invention, there is provided a recognition method using a computer including: recognizing a visual field range which extends from a viewpoint of a driver of a moving object in a line-of-sight direction and extends at a predetermined angle as moving away from the viewpoint with reference to a detection result of a line-of-sight detection device; recognizing a target present in a surrounding environment of the moving object shown within image data on the basis of the image data in which surroundings of the moving object are imaged by a visual sensor disposed in the moving object and setting an area of the recognized target in a predetermined shape; and setting a plurality of determination points in the area of the target and determining whether or not the driver is recognizing the target on the basis of a degree of overlap between the plurality of determination points and the visual field range.

(13): According to an aspect of the present invention, there is provided a computer-readable non-transitory storage medium storing a program for causing a computer to: recognize a visual field range which extends from a viewpoint of a driver of a moving object in a line-of-sight direction and extends at a predetermined angle as moving away from the viewpoint with reference to a detection result of a line-of-sight detection device; recognize a target present in a surrounding environment of the moving object shown within image data on the basis of the image data in which surroundings of the moving object are imaged by a visual sensor disposed in the moving object and set an area of the recognized target in a predetermined shape; and set a plurality of determination points in the area of the target and determine whether or not the driver is recognizing the target on the basis of a degree of overlap between the plurality of determination points and the visual field range.

According to the above-described aspects (1) to (13), it is possible to determine whether or not a driver is recognizing a target in a traveling direction of a moving object with a low load.

DETAILED DESCRIPTION OF THE INVENTION

Hereinafter, embodiments of a recognition device, a recognition method, and a storage medium according to the present invention will be described with reference to the drawings. In the following description, an example of a recognition system including the recognition device of the present invention will be described. Although a case in which left-hand traffic regulations are applied will be described, it is only necessary to reverse the left and right when right-hand traffic regulations are applied.

Example of Overall Configuration of Recognition System 1

Figure 1:
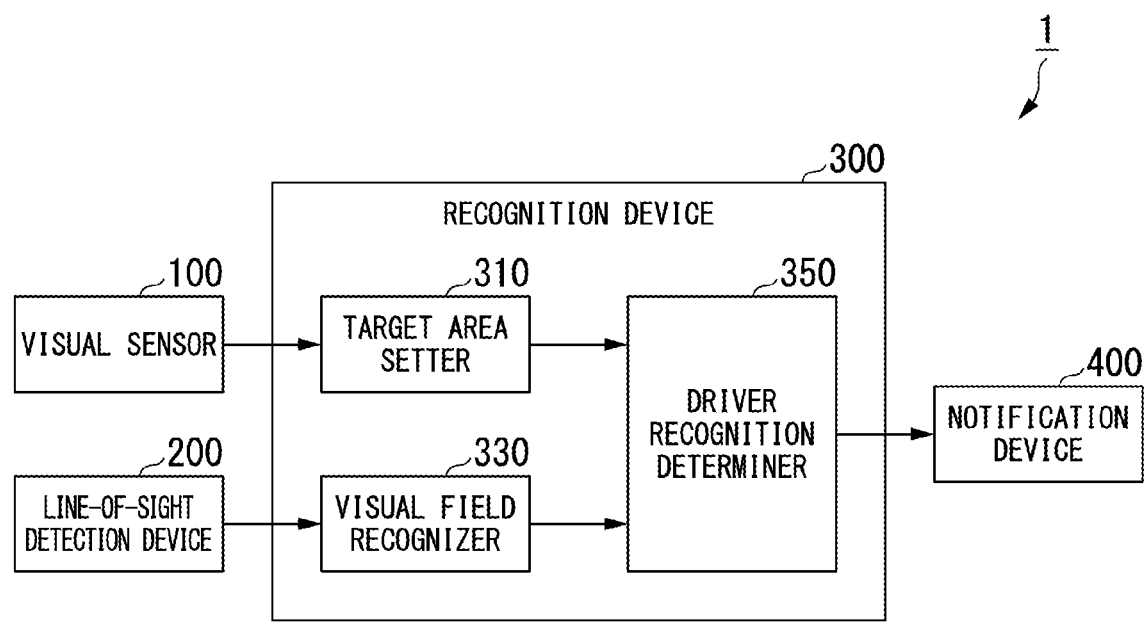
FIG. 1 is a schematic configuration diagram of a recognition system including a recognition device according to an embodiment.

FIG. 1 is a schematic configuration diagram of a recognition system 1 including the recognition device according to the embodiment. For example, a vehicle in which the recognition system 1 is mounted is, for example, a four-wheeled vehicle. A driving source of the vehicle is an internal combustion engine such as a diesel engine or a gasoline engine, an electric motor, or a combination thereof. The electric motor is operated using electric power generated by an electric power generator connected to the internal combustion engine or discharge electric power of a secondary battery or a fuel cell.

The recognition system 1 includes, for example, a visual sensor 100, a line-of-sight detection device 200, a recognition device 300, and a notification device 400.

For example, the visual sensor 100 is a digital camera using a solid-state imaging element such as a charge coupled device (CCD) or a complementary metal oxide semiconductor (CMOS). The visual sensor 100 is attached to any position on the vehicle (hereinafter referred to as a host vehicle M) in which the recognition system 1 is mounted. When the view in front of the host vehicle M is imaged, the visual sensor 100 is attached to an upper part of a front windshield, a rear surface of a rearview mirror, or the like. For example, the visual sensor 100 periodically and iteratively images the surroundings of the host vehicle M. The visual sensor 100 outputs image data of an image obtained by imaging the surroundings of the host vehicle M to the recognition device 300.

The visual sensor 100 may capture a three-dimensional image including a distance without capturing a planar image. For example, the visual sensor 100 may be a stereo camera. For example, the visual sensor 100 may be a light detection and ranging (LIDAR) sensor. In the case of the LIDAR sensor, the visual sensor 100 radiates light around the host vehicle M and measures scattered light. The visual sensor 100 detects a distance to a target on the basis of a time period from light emission to light reception. The light to be radiated is, for example, a pulsed laser beam. When the visual sensor 100 is configured to image the surroundings of the host vehicle M as a three-dimensional space, image data including a distance from each subject (another vehicle, a pedestrian, a bicycle, a fixed object, or the like) included in the captured image may be output to the recognition device 300. In the following description, it is assumed that the visual sensor 100 captures a planar image and outputs image data to the recognition device 300.

The line-of-sight detection device 200 includes, for example, a line-of-sight measurement (detection) camera using a solid-state imaging device such as a CCD or a CMOS and a light emitting diode (LED). The line-of-sight detection device 200 is attached to any position where a direction of a line of sight of the driver sitting in the driver seat of the host vehicle M can be detected in the interior of the host vehicle M in which the recognition system 1 is mounted. The line-of-sight detection device 200 includes an image analysis device, and for example, detects a direction of the line of sight of the driver using the fact that there is a difference in distortion of light radiated in a certain direction between a cornea portion and a surrounding portion (a so-called sclera portion) thereof in human eyes. More specifically, for example, the line-of-sight detection device 200 detects the direction of the line of sight of the driver by causing the LED to radiate near-infrared light in the direction of the driver's eyes and detecting a part in which a captured image of the radiated near-infrared light in the driver's eye area is distorted. The line-of-sight detection device 200 outputs information indicating the detected direction of the line of sight of the driver (hereinafter referred to as line-of-sight information) to the recognition device 300 as a detection result.

Example of Line-of-Sight Detection Device 200

Figure 2:
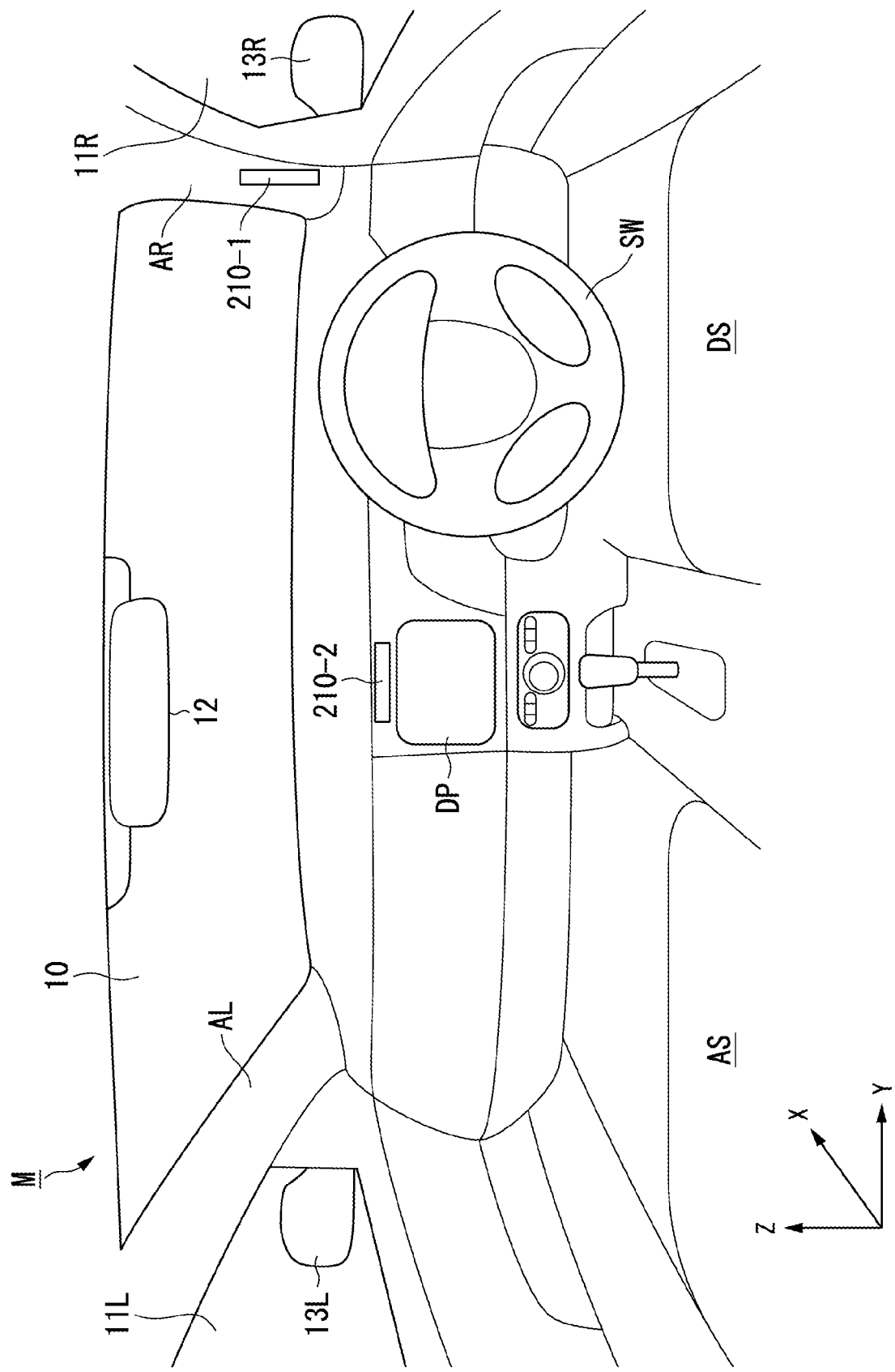
FIG. 2 is a diagram showing an example of a line-of-sight detection device.

Here, an example of the line-of-sight detection device 200 constituting the recognition system 1 will be described. FIG. 2 is a diagram showing an example of the line-of-sight detection device 200. The line-of-sight detection device 200 shown in FIG. 2 includes two line-of-sight detectors 210. FIG. 2 shows an example in which each of the two line-of-sight detectors 210 is disposed in the interior of the host vehicle M.

In the interior of the host vehicle M, for example, a driver seat DS provided with a steering wheel SW and a passenger seat AS provided in a vehicle width direction (a Y-direction in FIG. 2) with respect to the driver seat DS are present. In the interior of the host vehicle M, a front windshield 10 is present in a front window frame, a side windshield 11R is present in a window frame of a driver seat door, and a side windshield 11L is present in a window frame of a passenger seat door. The driver sitting in the driver seat DS can recognize front and side situations outside the host vehicle M through the front windshield 10, the side windshield 11R, and the side windshield 11L. In the interior of the host vehicle M, a rear-view mirror 12 is present at the upper front, a side mirror 13R is present on the exterior of the vehicle in front of the driver seat door, and a side mirror 13L is present on the exterior of the vehicle in front of the passenger seat door. The driver sitting in the driver seat DS can recognize a rear situation outside the vehicle via the rear-view mirror 12, the side mirror 13R, and the side mirror 13L.

In the interior of the host vehicle M as shown in FIG. 2, a first line-of-sight detector 210-1 and a second line-of-sight detector 210-2 included in the line-of-sight detection device 200 are disposed at different positions between which the driver is sandwiched in a vehicle width direction. More specifically, the first line-of-sight detector 210-1 is disposed on a right front pillar (a so-called A pillar) AR between the right side of the front windshield 10 and the front side of the side windshield 11R. For example, the second line-of-sight detector 210-2 is disposed above a display DP of a navigation device provided on a dashboard between the driver seat DS and the passenger seat AS. Thereby, the line-of-sight detection device 200 can detect the direction of the line of sight of the driver regardless of a direction of the face of the driver sitting in the driver seat DS. For example, the line-of-sight detection device 200 can detect the direction of the line of sight of the driver using at least one line-of-sight detector 210 between the side mirror 13R and the side mirror 13L between which the direction of the face of the driver is assumed to change.

The arrangement of the first line-of-sight detector 210-1 and the second line-of-sight detector 210-2 shown in FIG. 2 is merely an example and a position where each line-of-sight detector 210 is disposed may be appropriately changed in accordance with a configuration in the interior of the host vehicle M. For example, when the host vehicle M includes a corner windshield between the front windshield 10 and the side windshield 11R or between the front windshield 10 and the side windshield 11L, the first line-of-sight detector 210-1 may be disposed on the front pillar of the right corner windshield between the front windshield 10 and the side windshield 11R. A configuration in which each of the first line-of-sight detector 210-1 and the second line-of-sight detector 210-2 is disposed is not limited to a method in which components are embedded in a structure of the interior of the vehicle. Any configuration that enables the driver to recognize a situation outside the host vehicle M, i.e., that does not hinder the view when a state outside the vehicle is viewed may be used. For example, the first line-of-sight detector 210-1 may be configured to be attached to a driver-side end of a support member extending in a direction of the driver from the front pillar AR.

Returning to FIG. 1, the recognition device 300 determines whether or not the driver is recognizing a target present around the host vehicle M on the basis of the image data output by the visual sensor 100 and the line-of-sight information output by the line-of-sight detection device 200. The recognition device 300 instructs the notification device 400 to notify occupants including the driver of a direction in which there is a target determined to be unrecognized by the driver or a target determined to have a low degree of recognition.

The recognition device 300 includes, for example, a target area setter 310, a visual field recognizer 330, and a driver recognition determiner 350. These components include, for example, a hardware processor such as a central processing unit (CPU) and a storage device storing a program (software) (a storage device including a non-transitory storage medium), and a function of each component is implemented by the processor executing the program. Some or all of these components provided in the recognition device 300 may be implemented by hardware (a circuit unit including circuitry) such as large scale integration (LSI), an application specific integrated circuit (ASIC), a field-programmable gate array (FPGA), or a graphics processing unit (GPU) or the functions of the components may be implemented by software and hardware in cooperation. The functions of some or all of the components provided in the recognition device 300 may be implemented by dedicated LSI. Here, the program (software) may be pre-stored in a storage device such as a read only memory (ROM), a random access memory (RAM), a hard disk drive (HDD), or a flash memory (a storage device having a non-transitory storage medium) or may be stored in a removable storage medium (the non-transitory storage medium) such as a DVD or a CD-ROM and installed in the storage device when the storage medium is mounted in a drive device. The program (software) may be downloaded in advance from another computer device using short-range communication or wide-area communication and installed in the storage device.

The target area setter 310 recognizes a target shown in the image data output by the visual sensor 100 and sets a target area in which an area of the recognized target is represented in a predetermined shape. Here, targets recognized by the target area setter 310 from the image data include, for example, other vehicles, pedestrians, bicycles, stationary objects, and the like present around the host vehicle M. The other vehicles include other vehicles that are traveling in the same travel lane or an adjacent travel lane and opposite vehicles that are traveling in an opposite lane. The stationary objects include traffic lights, parked vehicles, and the like. The target area setter 310 sets a target area in which the periphery of the target is surrounded by a rectangular parallelepiped shape around each recognized target (which may be partially included inside the target). For example, the target area setter 310 extracts feature points of the recognized target and sets a sufficiently small rectangular parallelepiped shape including the extracted feature points as the target area. The target area setter 310 may set a rectangular target area instead of a target area of a rectangular parallelepiped shape with respect to the target according to an angle at which the target to be recognized is shown in the image data. The extraction of the feature points of the target and the setting of the target area can be performed using, for example, a process of generating a bounding box in the existing image processing technology. Thus, the target area set by the target area setter 310 may be referred to as the bounding box.

The target area setter 310 outputs image data output by the visual sensor 100 and information indicating the set target area to the driver recognition determiner 350. The information indicating the target area output to the driver recognition determiner 350 by the target area setter 310 includes information about the attribute of the target recognized by the target area setter 310. The target area setter 310 has an attribute determination function of determining the attribute of the recognized target. Here, the attribute indicates whether the target recognized by the target area setter 310 is a moving body such as another vehicle moving at a high speed, or a moving body such as a pedestrian or a bicycle moving at a low speed, a fixed object that does not move such as a traffic light installed on a road, or a moving object such as a parked vehicle that is present on a traveling route as a stationary object that is currently stationary.

The visual field recognizer 330 recognizes a range of a visual field (a visual field range) that extends in a direction of the line-of-sight of the driver with reference to the line-of-sight information output by the line-of-sight detection device 200. For example, the visual field recognizer 330 recognizes a range that extends in the direction of the line of sight with a viewpoint of the driver as the vertex and extends at a predetermined angle according to movement away from the viewpoint as the visual field range. The visual field recognizer 330 outputs the line-of-sight information output by the line-of-sight detection device 200 and the information indicating the recognized visual field range to the driver recognition determiner 350.

The driver recognition determiner 350 determines whether or not the driver is recognizing a target present around the host vehicle M (hereinafter, a recognition state) on the basis of information of the image data and the target area information output by the target area setter 310 and the line-of-sight information and the visual field range information output by the visual field recognizer 330. For example, the driver recognition determiner 350 determines the recognition state of the driver in the image data output by the target area setter 310, i.e., within the image space imaged by the visual sensor 100. Thus, the driver recognition determiner 350 first projects the image data output by the target area setter 310, i.e., the image data of the image captured by the visual sensor 100, onto a virtual screen. As the virtual screen onto which the driver recognition determiner 350 projects image data, for example, a screen corresponding to a front windshield can be considered. In the following description, it is assumed that the screen onto which the driver recognition determiner 350 projects image data is virtually present along the surface of the front windshield.

The driver recognition determiner 350 projects the target area set by the target area setter 310 onto an image plane represented by the virtually projected image data. Further, the driver recognition determiner 350 projects the visual field range of the driver output by the visual field recognizer 330 onto the same image plane where the target area is projected. When the visual field of the driver is projected onto the same image plane where the target area is projected, projection is performed so that the position of the target within the three-dimensional space shown within the image data is aligned with the position of the line of sight of the driver DR on the image plane. An alignment between the position of the target within the three-dimensional space and the position of the line of sight of the driver DR on the image plane may be performed when the driver recognition determiner 350 projects the image data, the target area, and the visual field range or the driver recognition determiner 350 may perform projection at a predetermined position in accordance with a difference between a position where the visual sensor 100 is attached and a position where the line-of-sight detection device 200 is attached in the host vehicle M (for example, an angle difference). The position at which the visual sensor 100 is attached to the host vehicle M and the position at which the line-of-sight detection device 200 is attached may be determined so that the detection positions of the visual sensor 100 and the line-of-sight detection device 200 are the same.

Then, the driver recognition determiner 350 designates a linear line indicating the direction of the line of sight of the driver output by the visual field recognizer 330 or a center point of a visual field range as an observation point of the driver and sets a plurality of determination points with respect to a target area on the basis of a positional relationship between the observation point and the target area. Here, the determination points set by the driver recognition determiner 350 include at least a center point of the target area and a nearest point and a farthest point between the linear line representing the direction of the line of sight of the driver or the observation point and the target area.

The driver recognition determiner 350 determines the recognition state of the driver for each target present around the host vehicle M recognized by the target area setter 310 on the basis of a degree of overlap between each set determination point and the visual field range. At this time, the driver recognition determiner 350 may change a degree of overlap between the determination point and the visual field range on the basis of an attribute of each target recognized by the target area setter 310, wherein the degree of overlap is a reference when the recognition state of the driver for each target is determined. For example, the driver recognition determiner 350 may change the number of determination points located within the visual field range on the basis of the attribute of the target area, wherein the number of determination points is a reference when it is determined that the driver recognizes the target.

The driver recognition determiner 350 determines the recognition state of the driver with respect to each target in accordance with a length of time during which each determination point overlaps the visual field range. For example, when a time period in which each determination point overlaps the visual field range is less than or equal to a first predetermined time period, the driver recognition determiner 350 determines that the driver is not recognizing the target as a target that is likely to be a risk when the traveling of the host vehicle M continues (hereinafter, an unrecognized state). For example, when the time period in which each determination point overlaps the visual field range exceeds the first predetermined time period but is less than or equal to a second predetermined time period, the driver recognition determiner 350 determines that the target is included in the visual field of the driver, but the driver is not fully recognizing the target as a target that is likely to be a risk when the traveling of the host vehicle M continues (a degree of recognition is low) (hereinafter, a partially recognized state). For example, when the time period in which each determination point overlaps the visual field range exceeds the second predetermined time period, the driver recognition determiner 350 determines that the target is included in the visual field of the driver and the driver is fully recognizing the target as a target that is likely to be a risk when traveling of the host vehicle M continues (hereinafter, a fully recognized state). At this time, the driver recognition determiner 350 may change a time period in which the determination point overlaps a visual field range as a reference when the recognition state of the driver for each target is determined on the basis of the attribute of each target recognized by the target area setter 310, for example, the first predetermined time period or the second predetermined time period.

The driver recognition determiner 350 may determine the recognition state of the driver for each target in accordance with a length of time obtained by summing (accumulating) a plurality of time periods in which each determination point overlaps the visual field range within a predetermined interval. This is because the driver may not be always facing in the same direction when the driver is driving the host vehicle M and change his/her line of sight to various directions. Also, this is because, when the target is included in the visual field of the driver a plurality of times within a predetermined short interval, there is a target for which it can be determined that the recognition state of the driver is the fully recognized state.

The driver recognition determiner 350 causes the notification device 400 to provide a notification of a direction in which there is a target in the unrecognized state or the partially recognized state (i.e., a target that is not being recognized by the driver or a target for which a degree of recognition is low as a target that is likely to be a risk when the traveling of the host vehicle M continues) on the basis of the determined recognition state of the driver for each target. At this time, the driver recognition determiner 350 outputs a notification instruction for providing a notification of the presence of the target to the notification device 400. The notification instruction output by the driver recognition determiner 350 to the notification device 400 includes information of a direction in which there is a target of which the driver is notified.

The notification device 400 includes, for example, a plurality of speakers (sound output units) disposed at different positions in the interior of the host vehicle M. The notification device 400 causes some or all of the plurality of speakers to output sounds in accordance with the notification instruction from the driver recognition determiner 350. At this time, the notification device 400 performs control for causing a sound image for a notification to be localized in the direction indicated by the information of the direction in which there is a target of which the driver is notified included in the notification instruction from the driver recognition determiner 350. In the control for causing the sound image to be localized, for example, a spatial position of a sound source perceived by the driver is defined by adjusting a magnitude of a sound that is transferred to left and right ears of the driver. In the present invention, a method and a configuration for controlling a spatial position at which a sound image is localized are not particularly defined. Accordingly, because the position at which the sound image is localized is determined on the basis of sound characteristics originally possessed by the sound source, information about an environment of an interior of the host vehicle M, and a head-related transfer function (HRTF), the notification device 400 may cause the sound image to be localized at a predetermined position by controlling speakers with an optimum output distribution obtained by a sensory test or the like in advance. Thereby, the driver can know a direction in which there is a target in the unrecognized state or the partially recognized state required to be recognized as a risk when the traveling of the host vehicle M continues.

The notification device 400 may include, for example, a display device (a so-called head-up display device) that displays images and information within the plane of the front windshield of the host vehicle M. Thereby, the driver can visually know the presence of a target required to be recognized as a risk when the traveling of the host vehicle M continues.

As described above, the recognition system 1 determines a recognition state of the driver for the target present around the host vehicle M on the basis of the target imaged by the visual sensor 100 and the direction of the line of sight of the driver detected by the line-of-sight detection device 200 and notifies the driver of the presence of the target that is likely to be a risk when the traveling of the host vehicle M continues. Thereby, in the host vehicle M in which the recognition system 1 is mounted, the driver can perform an operation (driving) of the host vehicle M corresponding to the target for which the notification is provided and the preparation therefor in advance and can continue traveling more safely.

Examples of Visual Field Range

Figure 3:
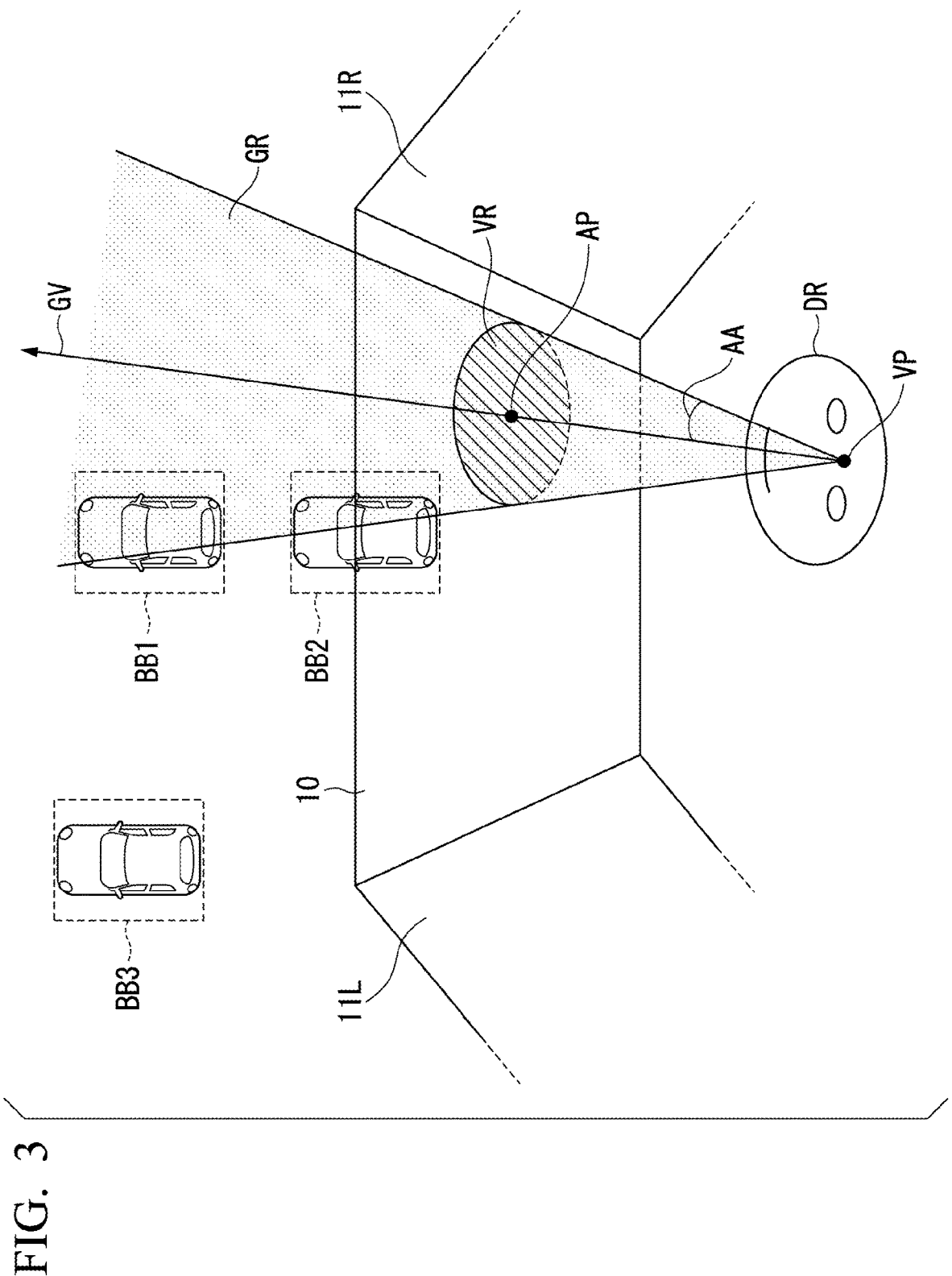
FIG. 3 is a diagram showing an example of a relationship between a direction of a line of sight detected by a line-of-sight detection device and a visual field range projected by a driver recognition determiner.

Next, a relationship between a direction of a line of sight detected by the line-of-sight detection device 200 and a visual field range of the recognition device 300 in the recognition system 1 will be described. FIG. 3 is a diagram showing an example of the relationship between the direction of the line of sight detected by the line-of-sight detection device 200 and the visual field range projected by the driver recognition determiner 350. In FIG. 3, the front windshield 10 in front of the host vehicle M, the side windshield 11R, and the side windshield 11L are schematically shown and a relationship between the direction of the line of sight of the driver DR detected by the line-of-sight detection device 200 and the visual field range recognized by the visual field recognizer 330 projected onto the image plane by the driver recognition determiner 350 when the driver DR of the host vehicle M is looking ahead is shown. In FIG. 3, the illustration of the front pillar AR and a left front pillar (A-pillar) AL between the left side of the front windshield 10 and the front side of the side windshield 11L is omitted for ease of description. In FIG. 3, an example of a target area recognized and set as the target by the target area setter 310 is also shown.

A visual field range VR of the driver DR is within a range of a conical line-of-sight beam range GR that extends in a direction (a depth direction) of a line-of-sight vector GV representing the line of sight of the driver DR with a viewpoint VP of the driver DR as a vertex and extends at a predetermined angle (a vertex angle AA) according to movement away from the viewpoint VP. In the recognition device 300, the visual field range VR is an elliptical range centered on a position of an observation point AP at which the driver DR performs observation on the line-of-sight vector GV within the range of the line-of-sight beam range GR. This is because it is assumed that the driver DR is looking at the road surface ahead of the host vehicle M, i.e., that the observation point AP of the driver DR is present on the road surface, even if the recognition device 300 (more specifically, the driver recognition determiner 350) has virtually projected the image data output by the target area setter 310 along the surface of the front windshield 10. In other words, this is because, even if the image data has been projected along the surface of the front windshield 10, the fact that the length of a line-of-sight beam to the road surface when the driver DR is looking at the physical object is not a regular length is reflected in the visual field range VR within the range of the conical line-of-sight beam range GR projected along the image plane.

The driver recognition determiner 350 performs a process of determining the recognition state of the driver DR for each target under the assumption that the observation point AP and the visual field range VR move on an image plane represented by image data projected along the front windshield 10, for example, that the observation point AP and the visual field range VR move within the plane of the front windshield 10. More specifically, the driver recognition determiner 350 performs a process of determining the recognition state of the driver DR for each target on the basis of a degree of overlap between the target area BB of each target recognized and set by the target area setter 310 (more specifically, each determination point set with respect to each target area BB) and the visual field range VR on the image plane represented by the image data projected along the front windshield 10. In FIG. 3, the driver recognition determiner 350 determines that the driver DR is not recognizing another vehicle for which a target area BB3 that does not overlap the line-of-sight beam range GR is set (the unrecognized state). In FIG. 3, the driver recognition determiner 350 determines that the driver DR is recognizing other vehicles for which a target area BB1 and a target area BB2 overlapping the line-of-sight beam range GR are set. The driver recognition determiner 350 also determines whether the state is the partially recognized state or the fully recognized state with respect to each of the other vehicle for which the target area BB1 is set and the other vehicle for which the target area BB2 is set.

Example of Recognition State Determination Method

Figure 4:
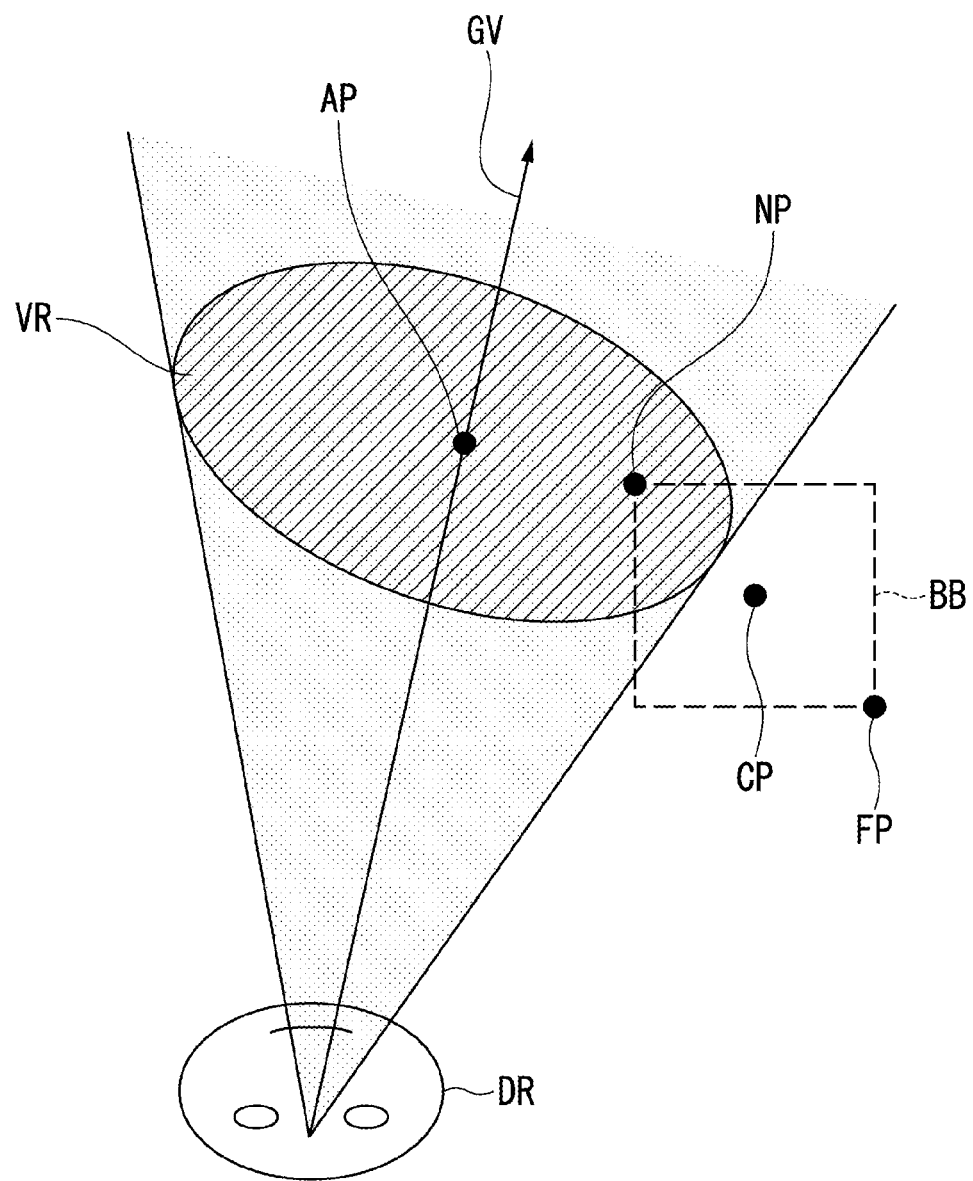
FIG. 4 is a diagram showing an example of a method in which the driver recognition determiner determines a target recognition state of a driver.

Next, a method in which the driver recognition determiner 350 determines the target recognition state of the driver DR in the recognition system 1 will be described. FIG. 4 is a diagram showing an example of a method in which the driver recognition determiner 350 determines the target recognition state of the driver DR. FIG. 4 shows relationships between the line-of-sight vector GV representing the line of sight of the driver DR and the target area BB and the visual field range VR projected by the driver recognition determiner 350. When the target recognition state of the driver DR is determined, the driver recognition determiner 350 sets a determination point of each of a center point CP, a nearest point NP between the line-of-sight vector GV or the observation point AP and the target area BB, and a farthest point FP between the line-of-sight vector GV or the observation point AP and the target area BB with respect to the projected target area BB. The driver recognition determiner 350 determines the recognition state of the driver DR for the target for which the target area BB is set on the basis of how many determination points are located within the visual field range VR. In FIG. 4, a state in which one determination point (the nearest point NP) is located within the range of the visual field range VR is shown.

Figure 5:
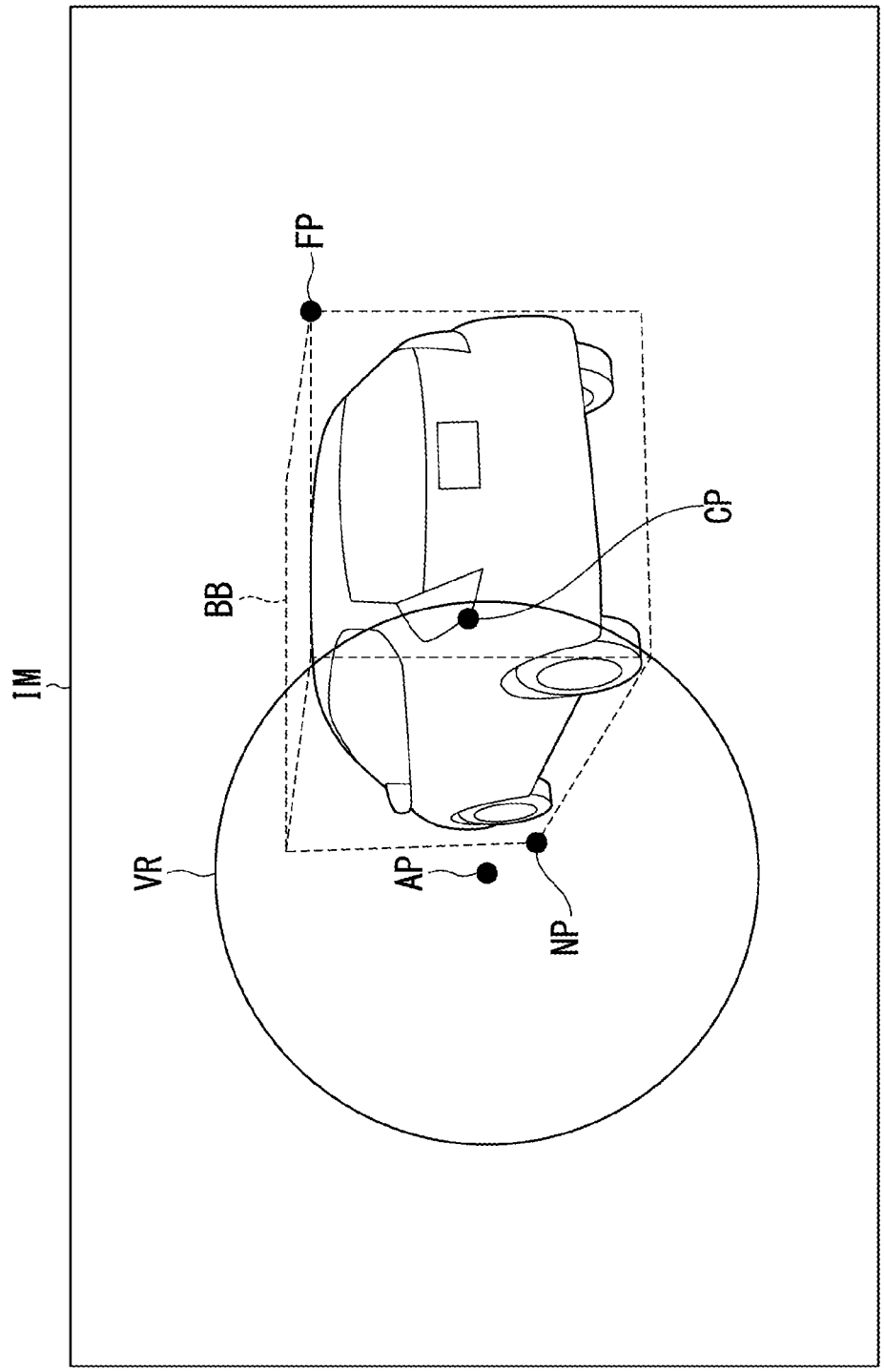
FIG. 5 is a diagram showing a specific example in which the driver recognition determiner determines a target recognition state of the driver.
Figure 6:
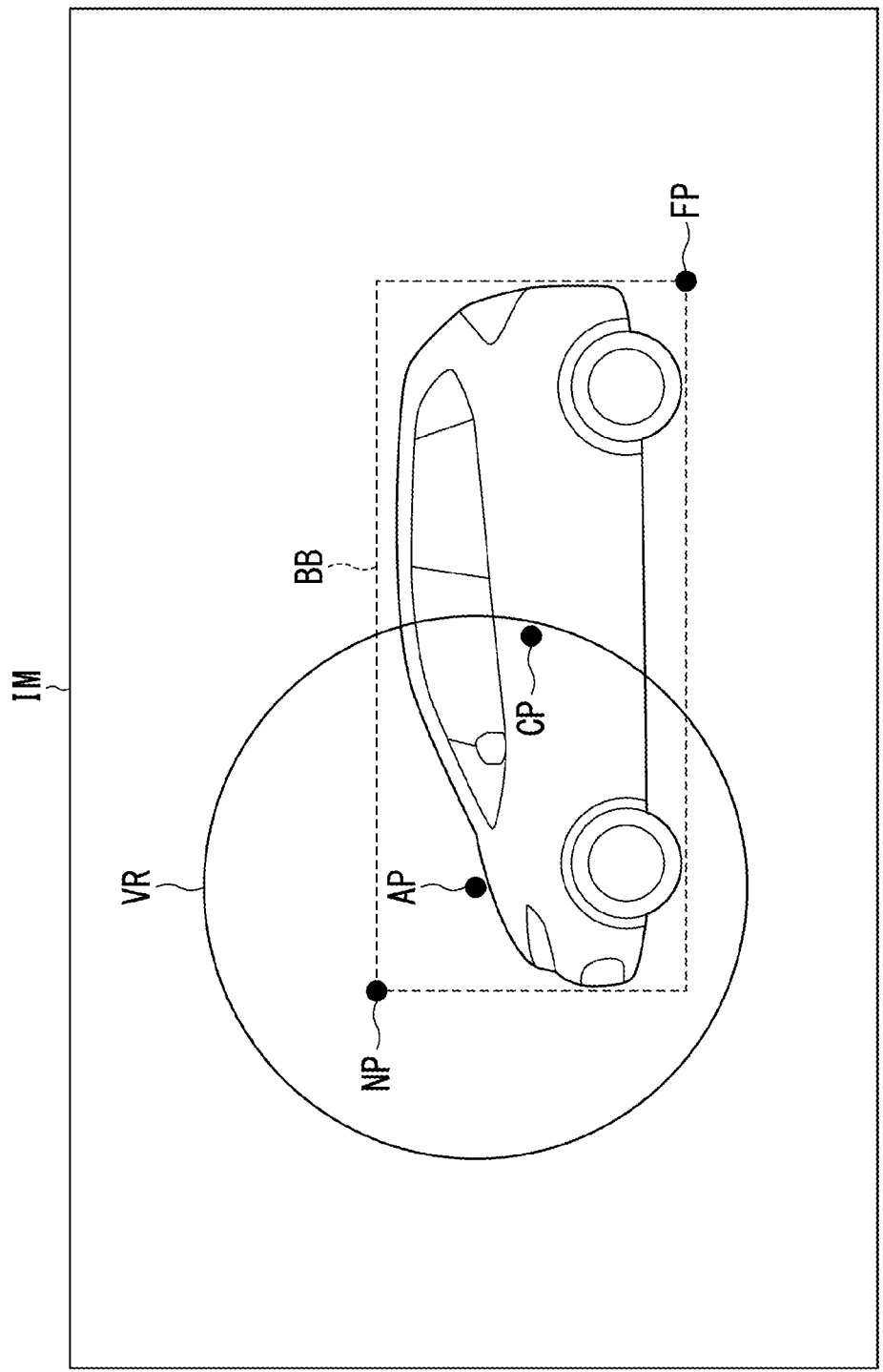
FIG. 6 is a diagram showing another specific example in which the driver recognition determiner determines a target recognition state of the driver.

Here, a specific example of the relationship between the target area BB and the visual field range VR projected by the driver recognition determiner 350 will be described. FIGS. 5 and 6 are diagrams showing specific examples in which the driver recognition determiner 350 determines the target recognition state of the driver DR. In FIGS. 5 and 6, for ease of description, an example in which the target area BB set by the target area setter 310 and the visual field range VR recognized by the visual field recognizer 330 have been projected onto an image plane of an image IM of one frame captured by the visual sensor 100 is shown. In FIGS. 5 and 6, for ease of description, an example in which each determination point is set on the basis of the observation point AP is shown.

First, a specific example in which the target recognition state of the driver DR is determined will be described with reference to FIG. 5. For example, FIG. 5 is an example of a case in which the recognition state of the driver DR for another vehicle in front that is traveling in the same direction as a direction in which the host vehicle M is traveling, i.e., a so-called preceding vehicle, is determined. When the target for which the recognition state of the driver DR is determined is a preceding vehicle, the target area setter 310 sets a target area BB having a rectangular parallelepiped shape as shown in FIG. 5.

The driver recognition determiner 350 sets determination points of the center point CP, the nearest point NP, and the farthest point FP with respect to the target area BB having a rectangular parallelepiped shape projected onto the image plane of the image IM. The driver recognition determiner 350 projects the visual field range VR onto the image plane of the image IM. The driver recognition determiner 350 determines whether or not each determination point is located within the visual field range VR. In the example shown in FIG. 5, the driver recognition determiner 350 determines that the nearest point NP and the center point CP are located within the visual field range VR, i.e., that the two determination points are located within the visual field range VR. The driver recognition determiner 350 determines the recognition state (the partially recognized state or the fully recognized state) of the driver DR for the target area BB having a rectangular parallelepiped shape, i.e., a preceding vehicle for which the target area BB having the rectangular parallelepiped shape is set, in accordance with the number of determination points determined to be located in the visual field range VR and a length of time during which the determination points are located within the visual field range VR.

Next, another specific example in which the target recognition state of the driver DR is determined will be described with reference to FIG. 6. FIG. 6 is an example of a case in which the recognition state of the driver DR for another vehicle traveling across the front of the host vehicle M at an intersection or the like, i.e., a so-called intersecting vehicle, is determined. When the target for which the recognition state of the driver DR is determined is an intersecting vehicle, the target area setter 310 sets a rectangular target area BB as shown in FIG. 6.

The driver recognition determiner 350 sets determination points of the center point CP, the nearest point NP, and the farthest point FP with respect to the rectangular target area BB projected onto the image plane of the image IM. The driver recognition determiner 350 projects the visual field range VR onto the image plane of the image IM. The driver recognition determiner 350 determines whether or not each determination point is located within the visual field range VR. In the example shown in FIG. 6, the driver recognition determiner 350 determines that two determination points of the nearest point NP and the center point CP are located within the visual field range VR. The driver recognition determiner 350 determines the recognition state of the driver DR for the intersecting vehicle for which the rectangular target area BB is set in accordance with the number of determination points determined to be located in the visual field range VR and the length of time during which the determination points are located within the visual field range VR.

Figure 7:
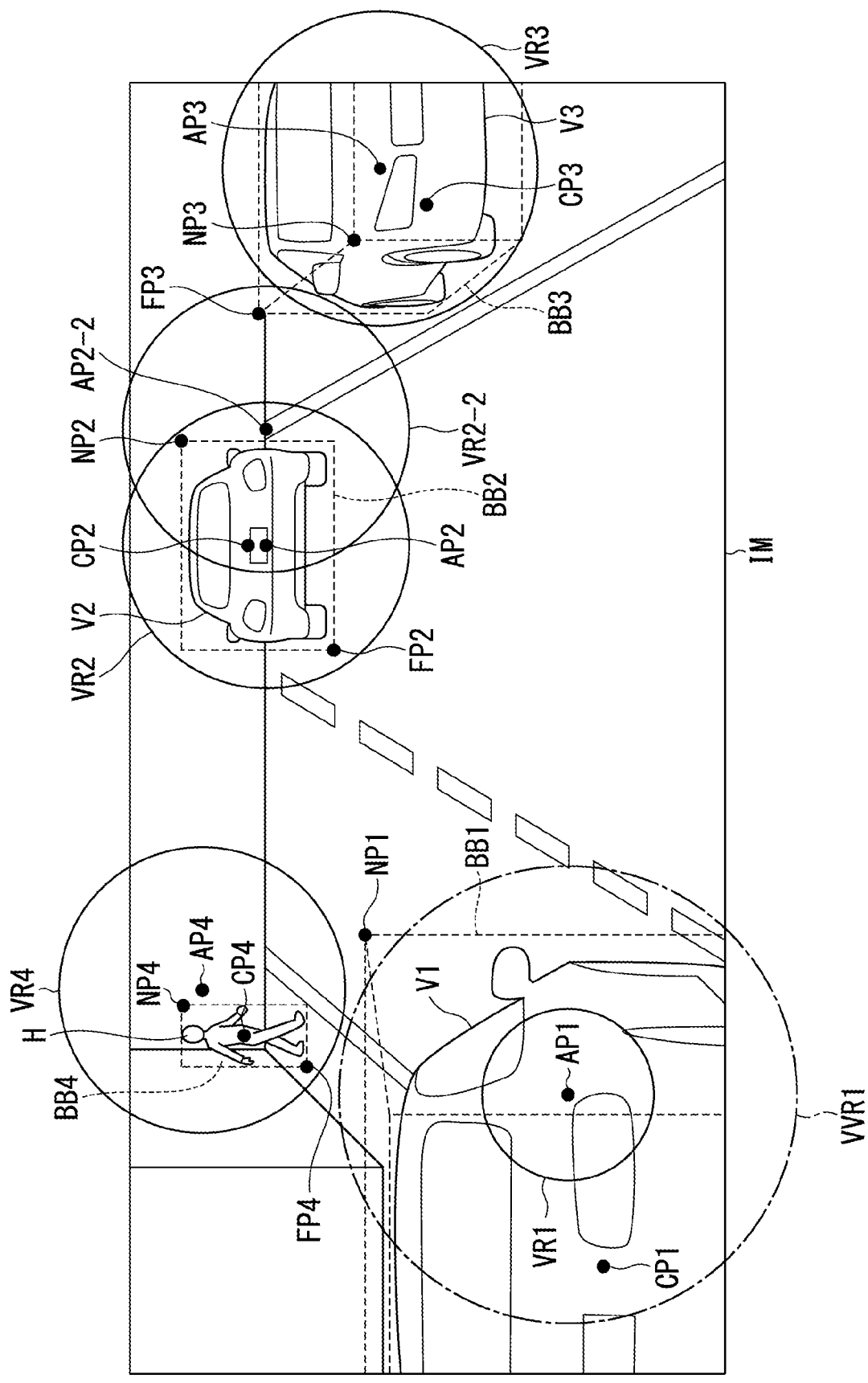
FIG. 7 is a diagram showing still another specific example in which the driver recognition determiner determines a target recognition state of the driver.

Next, a more specific example of the relationship between the target area BB and the visual field range VR projected by the driver recognition determiner 350 will be described. FIG. 7 is a diagram showing a more specific example in which the driver recognition determiner 350 determines a target recognition state of the driver DR. In FIG. 7, an example of a case in which the target area BB set by the target area setter 310 and the visual field range VR recognized by the visual field recognizer 330 are projected onto the image plane of the image IM of one frame captured by the visual sensor 100 is shown for ease of description. In FIG. 7, an example of a case in which each determination point is set on the basis of the observation point AP is shown for ease of description.

FIG. 7 shows a case in which four targets are shown within the image IM. More specifically, a case in which another vehicle that is traveling in a travel lane (a left lane) adjacent to a travel lane in which the host vehicle M is traveling (hereinafter, a parallel traveling vehicle V1), another vehicle that is traveling in front in the same travel lane (hereinafter, a preceding vehicle V2), another vehicle that is traveling in an adjacent opposite travel lane (hereinafter, an opposite vehicle V3), and a pedestrian H who is walking on a sidewalk are shown. In this case, the target area setter 310 sets a target area BB for each recognized target.

The driver recognition determiner 350 projects each target area BB set by the target area setter 310 onto the image plane of the image IM and sets determination points of the center point CP, the nearest point NP, and the farthest point FP with respect to each target area BB. The driver recognition determiner 350 projects the visual field range VR corresponding to each target recognized by the visual field recognizer 330 onto the image plane of the image IM. The driver recognition determiner 350 projects the visual field range VR having a size according to a distance between the host vehicle M and each target onto the image plane of the image IM. Because the size of the visual field range VR is within the range of the conical line-of-sight beam range GR, the size is smaller at a position nearer to the driver DR and is larger at a position farther from the driver DR. Thus, on the image plane of the image IM, the size of the visual field range VR decreases as the position approaches a lower end and the size of the visual field range VR increases as the position approaches an upper end. In the example shown in FIG. 7, the driver recognition determiner 350 projects a visual field range VR1 corresponding to the parallel traveling vehicle V1, projects a visual field range VR2 corresponding to the preceding vehicle V2, projects a visual field range VR3 corresponding to the opposite vehicle V3, and projects a visual field range VR4 corresponding to the pedestrian.

The driver recognition determiner 350 determines whether or not the determination point set for each of the target areas BB is located within the visual field range VR. In the example shown in FIG. 7, the driver recognition determiner 350 determines that a center point CP2, a nearest point NP2, and a farthest point FP2 of the target area BB2 corresponding to the preceding vehicle V2 are located within the visual field range VR2, i.e., that all the determination points are located within the visual field range VR2. In the example shown in FIG. 7, the driver recognition determiner 350 determines that the two determination points of a center point CP3 and a nearest point NP3 of the target area BB3 corresponding to the opposite vehicle V3 are located within the visual field range VR3. In the example shown in FIG. 7, the driver recognition determiner 350 determines that all determination points of a center point CP4, a nearest point NP4, and a farthest point FP4 of a target area BB4 corresponding to the pedestrian H are located within the visual field range VR4.

In the example shown in FIG. 7, the driver recognition determiner 350 determines that any one of the center point CP1, the nearest point NP1, and the farthest point FP1 set with respect to the target area BB1 corresponding to the parallel traveling vehicle V1 is not located within the visual field range VR1. However, the entire visual field range VR1 is the target area BB1. In this case, the driver recognition determiner 350 determines, for example, that the center point CP1 is located within the visual field range VR1, i.e., one determination point is located within the visual field range VR1. When a determination point in the visual field range VR at a position near the driver DR, i.e., near the host vehicle M, is determined as in the visual field range VR1, for example, the driver recognition determiner 350 may set a virtual visual field range VVR1 obtained by virtually extending the range of the visual field range VR1 and determine a determination point of the target area BB1 located within the virtual visual field range VVR1 as a determination point of the target area BB1 located within the visual field range VR1.

The driver recognition determiner 350 determines the recognition state of the driver DR for each target in accordance with the number of determination points determined to be located within each visual field range VR. At this time, the driver recognition determiner 350 may change the number of determination points that is a reference for determining the recognition state of the driver DR on the basis of the attribute of each target recognized by the target area setter 310.

For example, when the attribute of the target recognized by the target area setter 310 is a moving object such as another vehicle that is moving at a high speed or a stationary object that does not move such as a traffic light installed on a road or a parked vehicle, the driver recognition determiner 350 may change the number of determination points that is a reference for determining a recognition state of the driver DR on the basis of a distance between the target and the driver DR (i.e., the host vehicle M). For example, when the target is located at a position near the driver DR (near the host vehicle M), the driver recognition determiner 350 may set the number of determination points located within the visual field range VR that is a reference when it is determined that the driver DR is recognizing the target to 1. For example, when the target is located at a position far from the driver DR (far from the host vehicle M), the driver recognition determiner 350 may set the number of determination points located within the visual field range VR that is a reference when it is determined that the driver DR is recognizing the target to 3. That is, the driver recognition determiner 350 may use the fact that all the determination points are located within the visual field range VR as a reference when it is determined that the driver DR is recognizing the target. When the target is present at a position near the middle, the driver recognition determiner 350 may set the number of determination points located within the visual field range VR that is a reference when it is determined that the driver DR is recognizing the target to 2.

Thereby, in the example shown in FIG. 7, the driver recognition determiner 350 determines that the parallel traveling vehicle V1 for which only one determination point (for example, the center point CP1) is located within the visual field range VR1 is a target that satisfies a criterion. In the example shown in FIG. 7, the driver recognition determiner 350 determines the preceding vehicle V2 in which all (three) determination points are located within the visual field range VR2 as a target that satisfies a criterion. In the example shown in FIG. 7, the driver recognition determiner 350 determines that a target is present at a position near the middle and that the opposite vehicle V3 for which two determination points (the center point CP3 and the nearest point NP3) are located within the visual field range VR3 is a target that satisfies a criterion.

As in the example shown in FIG. 7, when the driver recognition determiner 350 projects the visual field range VR2 corresponding to the preceding vehicle V2 to a position of a visual field range VR2-2 on the image plane of the image IM, only two determination points of the center point CP2 and the nearest point NP2 of the target area BB2 are located within the visual field range VR2-2. Thus, the driver recognition determiner 350 does not determine the preceding vehicle V2 as a target that satisfies a criterion.

As an image processing technique, for example, there is a method of treating and processing an image as a group of points or a technique for recognizing points having a large difference in luminance within an image as edge points and recognizing a target according to those points. When such an image processing technique is used, not all points are determined to be determination points, but a point having more features in each target (for example, a taillight portion or a number of a car, a headlight of a motorcycle, and the like) or the farthest point, the center point, or the like of the target may be set as a representative point, and the set representative point may be used as a determination point to determine whether or not the target satisfies the criterion. In this case, a position of the representative point may be changed in accordance with the target.

For example, when the attribute of the target recognized by the target area setter 310 is a small moving object such as a pedestrian or a bicycle moving at a low speed, the driver recognition determiner 350 may set the number of determination points located within the visual field range VR that is a reference when it is determined that the driver DR is recognizing the target to 3 regardless of a distance between the target and the driver DR (i.e., the host vehicle M). That is, the driver recognition determiner 350 may use the fact that all the determination points are located within the visual field range VR as a reference when it is determined that the driver DR is recognizing the target. Thereby, in the example shown in FIG. 7, the driver recognition determiner 350 determines a pedestrian H for which all (three) determination points are located within the visual field range VR4 as a target that satisfies a criterion.

The driver recognition determiner 350 determines the recognition state of the driver DR (the unrecognized state, the partially recognized state, or the fully recognized state) for each target in accordance with a length of time during which a number of determination points equal to the number that is the reference are located within each visual field range VR (a criterion is satisfied). In other words, the driver recognition determiner 350 determines the recognition state of the driver DR for each target in accordance with a length of time during which the line of sight of the driver DR stays at the position of the target. Although the length of time during which the line of sight of the driver DR stays at the position of the target may be determined by measuring a time period in which a state in which a number of determination points equal to the number that is the reference are located within each visual field range VR (the criterion is satisfied) continues, the determination may be made according to the number of frames in which the state in which the criterion is satisfied continues, wherein the frames are captured by the visual sensor 100.

When a time period in which a number of determination points equal to the number that is the reference are located within each visual field range VR is, for example, less than or equal to a first predetermined time period of about 200 [ms], the driver recognition determiner 350 determines that the target recognition state of the driver DR is the "unrecognized state". When the time period in which a number of determination points equal to the number that is the reference are located within each visual field range VR exceeds the first predetermined time period, but is less than or equal to a second predetermined time period of, for example, about 600 [ms], the driver recognition determiner 350 determines that the target recognition state of the driver DR is the "partially recognized state". When the time period in which a number of determination points equal to the number that is the reference are located within each visual field range VR exceeds the second predetermined time period, the driver recognition determiner 350 determines that the target recognition state of the driver DR is the "fully recognized state".

The first predetermined time period and the second predetermined time period described above are merely examples and each predetermined time period may be appropriately changed to determine the recognition state of the driver DR in a plurality of steps. The driver recognition determiner 350 may change lengths of the first predetermined time period and the second predetermined time period on the basis of the attribute of each target recognized by the target area setter 310. For example, when the attribute of the target recognized by the target area setter 310 is a moving object such as another vehicle in a state in which the target is moving at a high speed, the driver recognition determiner 350 may change the first predetermined time period or the second predetermined time period to a longer time period. Thereby, the driver recognition determiner 350 can determine a state in which the driver DR is recognizing the other vehicle more reliably. For example, when the attribute of the target recognized by the target area setter 310 is a moving object such as a pedestrian and a bicycle moving at a low speed or a stationary object such as a traffic light installed on a road and a parked vehicle, the driver recognition determiner 350 may change the first predetermined time period or the second predetermined time period to a shorter time period. The driver recognition determiner 350 may determine a recognition state of the driver DR for a moving object such as a pedestrian or a stationary object according to the length of time obtained by summing a plurality of time periods in which a number of determination points equal to the number that is the reference are located within the visual field range VR. Thereby, the driver recognition determiner 350 can determine that the driver DR is recognizing the target by viewing a moving object such as a pedestrian or a bicycle or a stationary object such as a traffic light or a parked vehicle a plurality of times.

The driver recognition determiner 350 outputs a notification instruction for causing a notification of a direction in which there is a target for which the recognition state of the driver DR is the "unrecognized state" or the recognition state of the driver DR is the "partially recognized state (the degree of recognition is low)" to be provided to the notification device 400 on the basis of the determined recognition state of the driver D for each target and causes the notification device 400 to provide the notification.

Example of Process of Recognition Device 300

Figure 8:
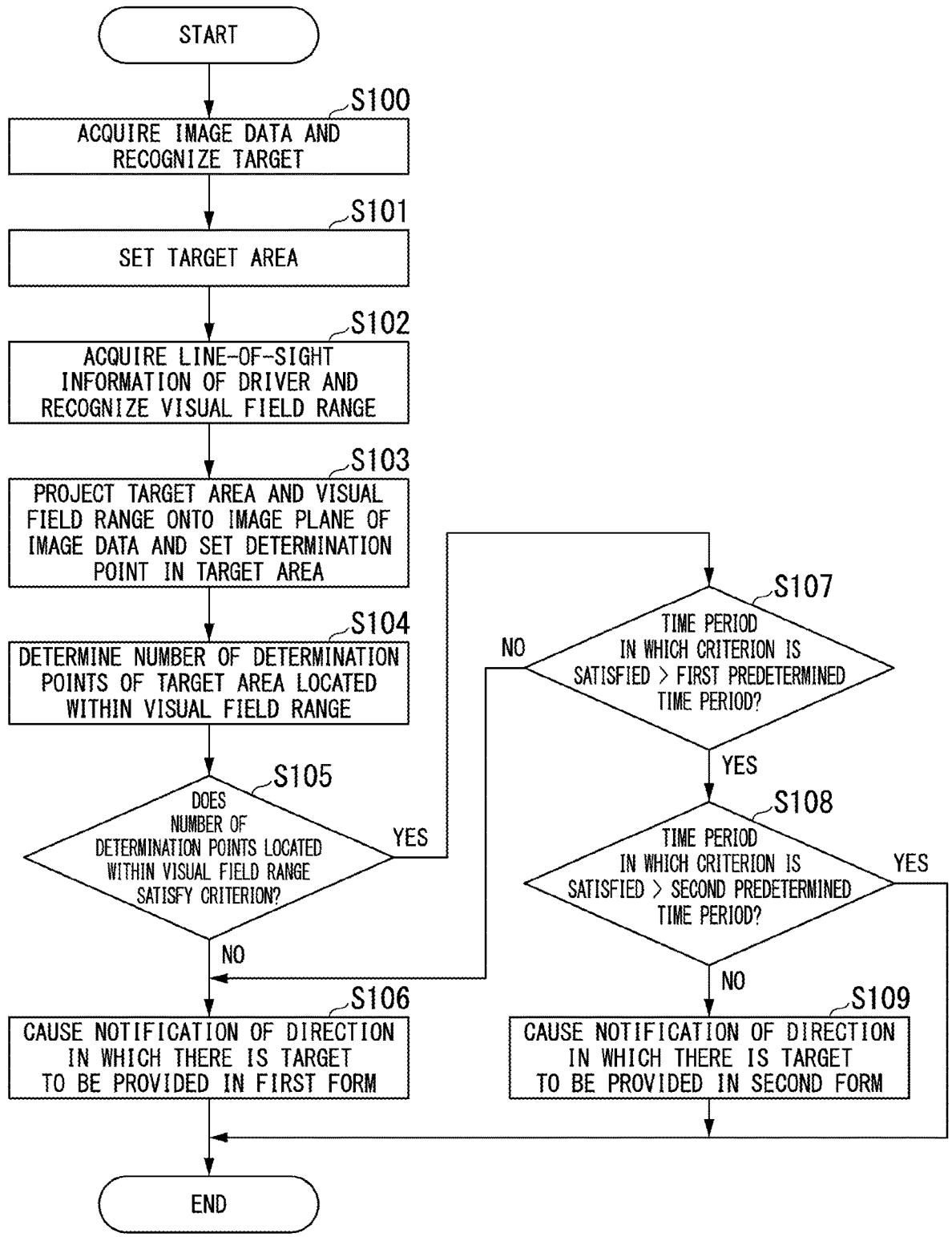
FIG. 8 is a flowchart showing an example of a flow of a process to be executed by the recognition device.

Next, a process of the recognition device 300 in the recognition system 1 will be described. FIG. 8 is a flowchart showing an example of a flow of a process to be executed by the recognition device 300. The process of the present flowchart is iteratively executed at each predetermined time interval at which the visual sensor 100 captures an image IM of one frame. The driver recognition determiner 350 provided in the recognition device 300 determines the recognition state of the driver DR for each target shown in the image data of the image IM captured by the visual sensor 100. However, in the following description, only one target is assumed to be shown in the image IM captured by the visual sensor 100 for ease of description. For example, in the specific example shown in FIG. 7, only the preceding vehicle V2 is assumed to be shown within the image data of the image IM. The driver recognition determiner 350 is assumed to determine the recognition state of the driver DR for the preceding vehicle V2 shown in FIG. 7.

When the visual sensor 100 captures an image IM of one frame, the target area setter 310 acquires image data output by the visual sensor 100 and recognizes a target (the preceding vehicle V2) shown in the acquired image data (step S100). The target area setter 310 sets the target area BB (the target area BB2) for the recognized (preceding vehicle V2) (step S101). The target area setter 310 outputs the acquired image data and information indicating the set target area BB2 to the driver recognition determiner 350.

Next, the visual field recognizer 330 acquires line-of-sight information output by the line-of-sight detection device 200 and recognizes the visual field range VR (the visual field range VR2) of the driver DR with reference to the acquired line-of-sight information (step S102). The visual field recognizer 330 outputs the acquired line-of-sight information and information indicating the recognized visual field range VR2 to the driver recognition determiner 350.

Next, the driver recognition determiner 350 virtually projects the image data output by the target area setter 310 along the surface of the front windshield 10 and projects the target area BB2 set by the target area setter 310 and the visual field range VR2 output by the visual field recognizer 330 onto an image plane represented by the image data. The driver recognition determiner 350 sets determination points (the center point CP2, the nearest point NP2, and the farthest point FP2) with respect to the projected target area BB2 (step S103).

Next, the driver recognition determiner 350 determines the number of determination points of the target area BB2 located within the visual field range VR2 (step S104). The driver recognition determiner 350 determines whether or not the number of determination points located within the visual field range VR2 satisfies a criterion of the number of determination points at the position of the projected preceding vehicle V2 (step S105). That is, the driver recognition determiner 350 determines whether or not the preceding vehicle V2 is a target that satisfies the criterion.

When it is determined that the preceding vehicle V2 is not a target that satisfies the criterion in step S105, the driver recognition determiner 350 determines that the recognition state of the driver DR for the preceding vehicle V2 is the "unrecognized state" and outputs a notification instruction for causing a notification of a direction in which the preceding vehicle V2 is present to be provided in a first form to the notification device 400 (step S106). Thereby, the notification device 400 notifies the driver DR of the direction in which the preceding vehicle V2 is present in the first form. The driver recognition determiner 350 ends the process of the present flowchart for the current image IM captured by the visual sensor 100.

The notification method according to the first form in the notification device 400 may be, for example, a method of causing a sound image to be localized by a plurality of speakers in a direction in which the preceding vehicle V2 is present. The notification method according to the first form in the notification device 400 may be, for example, a method of causing an arrow indicating the direction in which the preceding vehicle V2 is present or information indicating the position of the preceding vehicle V2 (for example, the target area BB) to displayed on the front windshield 10 by the head-up display device. The notification method according to the first form in the notification device 400 may be a method in which the localization of the sound image and the display on the front windshield 10 are combined. The notification method according to the first form described above is merely an example and the notification method according to the first form may be appropriately changed in accordance with the configuration of the notification device 400.

On the other hand, when it is determined that the preceding vehicle V2 is a target that satisfies the criterion in step S105, the driver recognition determiner 350 determines whether or not a time period in which the criterion is satisfied exceeds the first predetermined time period (for example, about 200 [ms]) (step S107). When it is determined that the time period in which the criterion is satisfied does not exceed the first predetermined time period in step S107, the driver recognition determiner 350 returns the process 'to step S106. That is, the driver recognition determiner 350 causes the notification device 400 to notify the driver DR that the recognition state of the driver DR for the preceding vehicle V2 is the "unrecognized state" in the first form.

On the other hand, when it is determined that the time period in which the criterion is satisfied exceeds the first predetermined time period in step S107, the driver recognition determiner 350 determines whether or not the time period in which the criterion is satisfied exceeds the second predetermined time period (for example, about 600 [ms]) (step S108). When it is determined that the time period in which the criterion is satisfied does not exceed the second predetermined time period in step S108, the driver recognition determiner 350 determines that the recognition state of the driver DR for the preceding vehicle V2 is the "partially recognized state" and outputs a notification instruction for causing a notification of the direction in which the preceding vehicle V2 is present to be provided in the second form to the notification device 400 (step S109). Accordingly, the notification device 400 notifies the driver DR of the direction in which the preceding vehicle V2 is present in the second form. The driver recognition determiner 350 ends the process of the present flowchart on the current image IM captured by the visual sensor 100.

The notification method according to the second form in the notification device 400 is a method having a lower degree of notification than the notification method according to the first form. For example, when the notification method according to the first form is a method in which the localization of the sound image and the display on the front windshield 10 are combined, the notification method according to the second form may be a method of performing only the display on the front windshield 10 without performing the localization of the sound image. At this time, information to be displayed on the front windshield 10 may be either an arrow indicating a direction in which the preceding vehicle V2 is present or information indicating the position of the preceding vehicle V2. The notification method according to the second form described above is merely an example and the notification method according to the second form may be appropriately changed in accordance with a configuration of the notification device 400 or a relationship with the notification method according to the first form.

On the other hand, when it is determined that the time period in which the criterion is satisfied exceeds the second predetermined time period in step S108, the driver recognition determiner 350 determines that the recognition state of the driver DR for the preceding vehicle V2 is the "fully recognized state". The process of the present flowchart on the current image IM captured by the visual sensor 100 ends.

According to such processing (more specifically, the processing of steps S104 to S109), the driver recognition determiner 350 determines recognition states of the driver DR for all targets included in image data of the current image IM captured by the visual sensor 100. The driver recognition determiner 350 retains the determination result of the recognition state of the driver DR for each target for a predetermined time period (for example, about 3 to 5 [s]). This is because the determination result for the same target included in the visual field of the driver DR, i.e., the visual field range VR, is the "unrecognized state" all the time in the determination result for each image IM captured by the visual sensor 100 and the notification of the notification device 400 becomes complicated. By retaining the determination result of the recognition state of the driver DR, the recognition state of the driver DR for the same target continuously shown in the image data of the image IM captured by the visual sensor 100 and included in the visual field of the driver DR transitions as in the order of "unrecognized state"→"partially recognized state"→"fully recognized state". The notification of the notification device 400 is not provided for the target for which the recognition state of the driver DR is the "fully recognized state". For example, when the criterion is not satisfied because a pedestrian is hidden by the shadow of a parallel traveling vehicle but the criterion is subsequently satisfied because the pedestrian appears again from the shadow of the parallel traveling vehicle with the passage of time, the driver recognition determiner 350 can re-determine the pedestrian as a target satisfying the criterion on the basis of the retained determination result. Thereby, the notification of the notification device 400 for the pedestrian is not provided again.

However, the driver recognition determiner 350 clears (discards) the retained determination result when a time period in which the determination result of the recognition state of the driver DR is retained has reached a predetermined time period. Therefore, the driver recognition determiner 350 re-determines the recognition state of the driver DR for the same target. This is because it is necessary to steadily recognize the target (monitor a change) due to the change in a situation of each target present around the host vehicle M while the host vehicle M continuously travels, for example, even if the state is the "fully recognized state in which the driver DR has fully recognized a target that is likely to be a risk when the traveling of the host vehicle M continues.

As described above, in the recognition device 300, the image data output by the visual sensor 100 is projected onto a virtual screen, the target area BB of the target shown within the image data on the image plane and the visual field range VR recognized with reference to line-of-sight information output by the line-of-sight detection device 200 are projected, and the recognition state of the driver DR for the target present around the host vehicle M is determined. The recognition device 300 causes the notification device 400 to notify the driver DR of a direction in which there is a target in the unrecognized state or the partially recognized state with a low degree of recognition that is likely to be a risk when the driver DR continues the traveling of the host vehicle M. Thereby, in the host vehicle M in which the recognition system 1 including the recognition device 300 is mounted, the driver DR can perform an operation (driving) of the host vehicle M corresponding to the target for which the notification has been provided and the preparation therefor in advance and can continue traveling more safely.

The driver recognition determiner 350 provided in the recognition device 300 determines the recognition state of the driver DR for each target on the basis of image data of images IM of a plurality of frames captured by the visual sensor 100. Thus, the driver recognition determiner 350 can prevent the notification of the notification device 400 for allowing the driver DR to recognize another vehicle which is newly imaged in a current image IM captured by the visual sensor 100 and for which the driver DR can be determined to be already in the fully recognized state (hereinafter, an already-recognized state), for example, such as another vehicle that has overtaken the host vehicle M from behind a travel lane adjacent to a travel lane in which the host vehicle M is traveling.

Example of Method of Determining
Already-Recognized State

Figure 9:
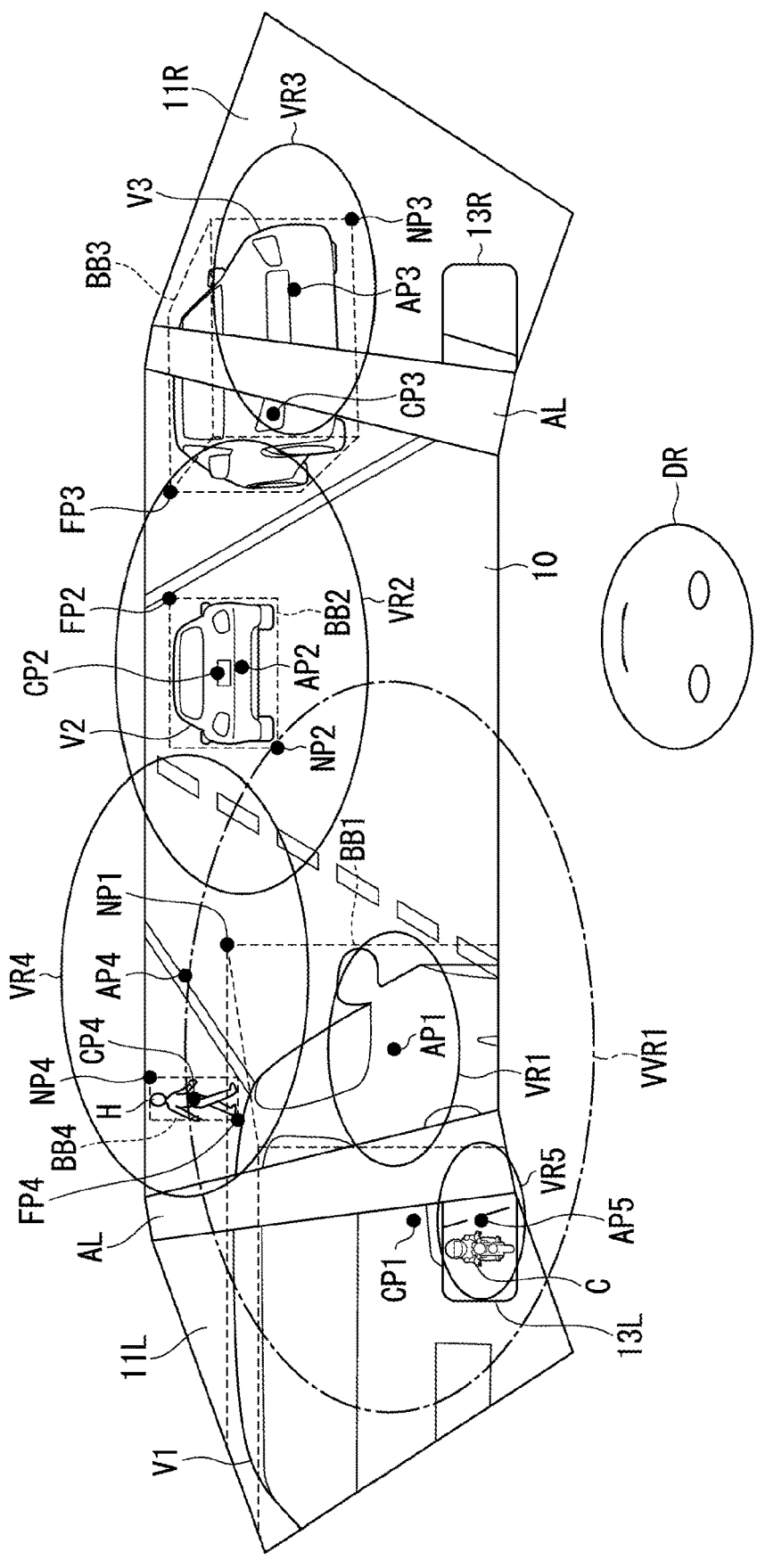
FIG. 9 is a diagram showing a first scene of an example in which the driver recognition determiner determines a target recognized by the driver.
Figure 10:
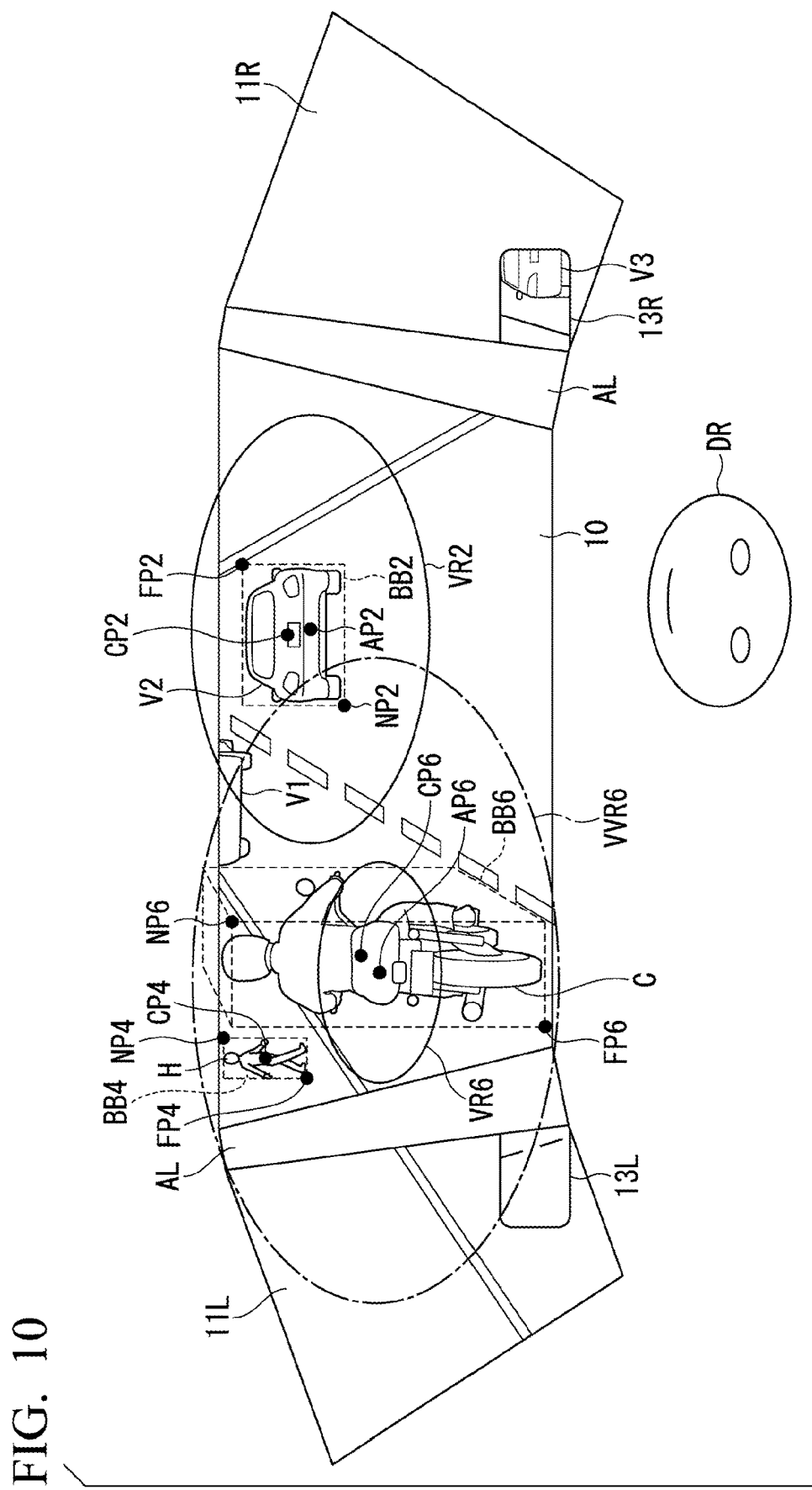
FIG. 10 is a diagram showing a second scene of an example in which the driver recognition determiner determines a target recognized by the driver.

Next, a method in which the driver recognition determiner 350 in the recognition system 1 determines a target recognition state of the driver DR that can be already considered to be the fully recognized state will be described. FIGS. 9 and 10 are diagrams showing scenes of examples in which the driver recognition determiner 350 determines a target recognized by the driver DR. FIGS. 9 and 10 schematically show the front windshield 10 on a front part of the host vehicle M, the side windshield 11R, the side windshield 11L, the side mirror 13R, the side mirror 13L, the front pillar AR, and the front pillar AL and show a state in which the recognition state of the driver DR for each target is determined. The scene shown in FIG. 9 is a first scene of a previous time and the scene shown in FIG. 10 is a second scene of a subsequent time.

In the following description, the visual sensor 100 is assumed to capture an image between the left side windshield 11L and the right side windshield 11R of the host vehicle M and images corresponding to the side mirror 13L and the side mirror 13R shown in FIGS. 9 and 10. The line-of-sight detection device 200 is assumed to detect a direction of the line of sight of the driver DR between the side mirrors 13L and 13R shown in FIGS. 9 and 10. It is assumed that a motorcycle that is traveling behind a travel lane (a left lane) adjacent to a travel lane in which the host vehicle M is traveling has overtaken the host vehicle M.

First, the recognition state of the driver DR in the first scene of the previous time will be described with reference to FIG. 9. The driver DR is recognizing the targets of the parallel traveling vehicle V1, the preceding vehicle V2, the opposite vehicle V3, and the pedestrian H. The repeated description of the relationship between the target area BB and the visual field range VR when each target is recognized in the first scene is omitted. When a line of sight of the driver DR is directed to the side mirror 13L in the first scene, it is possible to recognize that the motorcycle C is approaching the host vehicle M from behind the left lane. Thus, the driver recognition determiner 350 projects a visual field range VR5 of the driver DR toward the side mirror 13L recognized by the visual field recognizer 330 onto the image plane of the first scene. In the image of the range of the side mirror 13L, the target area setter 310 may not be able to set the target area BB corresponding to the motorcycle C because the area of the motorcycle C is small. Thus, the first scene shows a case in which the driver recognition determiner 350 does not project the target area BB corresponding to the motorcycle C onto the image plane.

Next, the recognition state of the driver DR in the second scene after the passage of time from the first scene will be described with reference to FIG. 10. When the scene has transitioned from the first scene to the second scene, positional relationships between the host vehicle M, the parallel traveling vehicle V1, and the opposite vehicle V3 change. Accordingly, the recognition state of the driver DR for each target also changes. In the second scene, the driver DR continuously recognizes only the preceding vehicle V2. At this time, as in the second scene, when the motorcycle traveling in the left lane overtakes the host vehicle M, the driver recognition determiner 350 projects a target area BB6 newly set by the target area setter 310 and a visual field range VR6 newly recognized by the visual field recognizer 330 onto the image plane of the second scene. The driver recognition determiner 350 sets determination points of a center point CP6, a nearest point NP6, and a farthest point FP6 with respect to the target area BB6. The driver recognition determiner 350 determines whether or not each determination point set for the target area BB6 is located within the visual field range VR6 and determines the recognition state of the driver DR for the motorcycle C.

At this time, when the recognition state of the driver DR for the motorcycle C is determined from only the second scene, the driver recognition determiner 350 determines that the center point CP6 set for the target area BB6 corresponding to the motorcycle C is located within the visual field range VR6, i.e., that one determination point is located within the visual field range VR6. Because the target area BB6 is a target area BB present at a position near the driver DR (near the host vehicle M), the driver recognition determiner 350 determines that the target satisfies a criterion of the number of determination points even if only one determination point (the center point CP6) is located within the visual field range VR6. When no determination point is located within the visual field range VR6, the driver recognition determiner 350 may be configured to determine the determination point of the target area BB6 located within the visual field range VR6 by setting a virtual visual field range VVR6 obtained by virtually extending the range of the visual field range VR6 on the basis of a concept similar to that of the virtual visual field range VVR1.

Here, the motorcycle C is a target newly imaged by the visual sensor 100 in the second scene. Thus, the driver recognition determiner 350 determines that the motorcycle C is not in at least a "fully recognized state" even though a number of determination points greater than or equal to the reference number of determination points are located within the visual field range VR6. Thus, the driver recognition determiner 350 outputs a notification instruction for causing a notification of a direction in which the motorcycle C is present to be provided to the notification device 400. Thereby, the notification device 400 notifies the driver DR of the direction in which the motorcycle C is present.

However, as described in the first scene, a line of sight of the driver DR is directed to the side mirror 13L and it is possible to consider that the driver DR is in a state in which the motorcycle C is already fully recognized. Thus, the driver recognition determiner 350 determines the target recognition state of the driver DR by going back a predetermined time period ago. Thereby, the driver recognition determiner 350 can also prevent the notification instruction for causing the notification of the direction in which the motorcycle C is present to be provided from being output to the notification device 400. Thereby, the driver recognition determiner 350 can avoid an unnecessary notification of a target for which the recognition state of the driver DR is already the fully recognized state.

The predetermined time period when the driver recognition determiner 350 determines the recognition state of the driver DR by going back in time is a time period less than or equal to a predetermined time period (for example, about 3 to 5 [s]) for which the determination result is retained. This is because, even if the driver DR is in the "fully recognized state" in which the motorcycle C is fully recognized as a target that is likely to be a risk when the driver DR continues to drive the host vehicle M, the situation of each target changes as described above and it is still necessary to steadily recognize the target (monitor the change).

As described above, the recognition device 300 can retroactively determine the target recognition state of the driver DR that can be considered to be already in the fully recognized state. Thereby, in the host vehicle M in which the recognition system 1 including the recognition device 300 is mounted, it is possible to prevent a notification of a direction in which there is a target for which the recognition state of the driver DR is already the fully recognized state from being unnecessarily provided.

In an example of the method of determining the already-recognized state, a case in which the target area setter 310 cannot set the target area BB corresponding to the motorcycle C on the basis of the image of the range of the side mirror 13L in the first scene shown in FIG. 9 has been described. However, the target area setter 310 may be able to set the target area BB corresponding to a target of a small area such as the motorcycle C on the basis of the image of the range of the side mirror 13L. In this case, when it can be determined that a target area BB5 projected in the first scene and a target area BB6 projected in the second scene are the target areas BB corresponding to the same motorcycle C, the driver recognition determiner 350 can determine the recognition state of the driver DR for the motorcycle C without going back a predetermined time period ago. Thereby, likewise, the driver recognition determiner 350 can avoid the unnecessary notification of the motorcycle C for which the recognition state of the driver DR is already the fully recognized state without outputting a notification instruction for causing the notification of the direction in which the motorcycle C is present to be provided to the notification device 400.

In the present embodiment, a case in which the virtual screen on which the recognition device 300 projects the image data is present along the surface of the front windshield 10 has been described. However, a position where the virtual screen is present is not limited to a position along the surface of the front windshield 10. For example, the virtual screen may be present at a position of the front end of the host vehicle M in the vehicle length direction.

In the present embodiment, a case in which the recognition device 300 determines the target recognition state of the driver DR on the basis of image data of an image captured by the visual sensor 100 imaging surroundings of the host vehicle M as a two-dimensional space has been described. However, the image used by the recognition device 300 to determine the target recognition state of the driver DR may be image data of an image obtained by imaging surroundings of the host vehicle M as a three-dimensional space. In this case, the recognition device 300 can determine the target recognition state of the driver DR within the three-dimensional space of the image instead of the image plane. However, the process of the recognition device 300 in this case can be considered to be similar to a process of determining the target recognition state of the driver DR on the basis of the image data of the two-dimensional space described above, except that information of a distance from the host vehicle M to the target can be used. Accordingly, the description of the process in which the recognition device 300 determines the target recognition state of the driver DR on the basis of the image data of the three-dimensional space is omitted.

According to the above-described embodiment, the recognition device 300 includes the visual field recognizer 330 configured to recognize a range, which extends from a viewpoint VP of the driver DR of the host vehicle M in a line-of-sight direction (the direction of the line-of-sight vector GV: the depth direction) and extends at a predetermined angle (the vertex angle AA) according to movement away from the viewpoint VP, as the visual field range VR with reference to a detection result of the line-of-sight detection device 200; the target area setter 310 configured to recognize a target (another vehicle or a pedestrian in the embodiment) present in a surrounding environment of the host vehicle M shown within image data on the basis of the image data in which surroundings of the host vehicle M are imaged by the visual sensor 100 disposed in the host vehicle M and set an area of the recognized target (the target area BB) in a predetermined shape; and the driver recognition determiner 350 configured to set a plurality of determination points (the center point CP, the nearest point NP, and the farthest point FP) in the area of the target (the target area BB) and determine whether or not the driver DR is recognizing the target on the basis of a degree of overlap between the plurality of determination points and the visual field range VR, so that it is possible to notify the driver DR of the presence of a target that is likely to be a risk when the traveling of the host vehicle M continues. Thereby, in the host vehicle M in which the recognition system 1 including the recognition device 300 is mounted, the driver DR can perform an operation (driving) of the host vehicle M corresponding to the target for which the notification is provided and the preparation therefor in advance and can continue traveling more safely.

The embodiment described above can be represented as follows.

A recognition device including:
a storage device storing a program; and
a hardware processor,
wherein the hardware processor executes the program stored in the storage device to:
recognize a visual field range which extends from a viewpoint of a driver of a moving object in a line-of-sight direction and extends at a predetermined angle as moving away from the viewpoint with reference to a detection result of a line-of-sight detection device;
recognize a target present in a surrounding environment of the moving object shown within image data on the basis of the image data in which surroundings of the moving object are imaged by a visual sensor disposed in the moving object and set an area of the recognized target in a predetermined shape; and
set a plurality of determination points in the area of the target and determine whether or not the driver is recognizing the target on the basis of a degree of overlap between the plurality of determination points and the visual field range.

Although modes for carrying out the present invention have been described using embodiments, the present invention is not limited to the embodiments and various modifications and substitutions can also be made without departing from the scope and spirit of the present invention.

What is claimed is:

1. A recognition device comprising:
a processor;
a memory storing program instructions executable by the processor to:
recognize a visual field range which extends from a viewpoint of a driver of a moving object in a line-of-sight direction and extends at a predetermined angle as moving away from the viewpoint with reference to a detection result of a line-of-sight detection device;
recognize a target present in a surrounding environment of the moving object shown within image data on the basis of the image data in which surroundings of the moving object are imaged by a visual sensor disposed in the moving object and set an area of the recognized target in a predetermined shape; and
set a plurality of determination points in the area of the target and determine whether or not the driver is recognizing the target on the basis of a degree of overlap between the plurality of determination points and the visual field range,
wherein the plurality of determination points include at least one determination point in the area of the target and at least two determination points on a boundary of the area of the target.

2. The recognition device according to claim 1,
wherein the plurality of determination points include at least a center point of the area of the target and a nearest point and a farthest point between a point projected on the image data in the line-of-sight direction or a linear line in the line-of-sight direction and the area of the target.

3. The recognition device according to claim 2,
wherein the predetermined shape is a rectangular parallelepiped shape centered on the target.

4. The recognition device according to claim 3,
wherein the processor is configured to:
project the visual field range onto an image plane represented by the image data and determine whether or not the driver is recognizing the target on the basis of a degree of overlap between the projected visual field range and the plurality of determination points.

5. The recognition device according to claim 4,
wherein the processor is configured to:
change the number of determination points located in the visual field range on the basis of an attribute of the target, the number of determination points being a reference when it is determined that the driver is recognizing the target.

6. The recognition device according to claim 5,
wherein the processor is configured to:
determine that the driver is recognizing the target including the determination points in a case where the determination points, the number of which is equal to the number that is the reference, are located in the visual field range for more than a predetermined time period.

7. The recognition device according to claim 6,
wherein the predetermined time period is a time period obtained by summing a plurality of time periods in which the determination points, the number of which is equal to the number that is the reference, are located in the visual field range within a predetermined interval.

8. The recognition device according to claim 6,
wherein the processor is configured to:
change the predetermined time period on the basis of the attribute of the target.

9. The recognition device according to claim 8,
wherein the processor is configured to:
determine whether the driver is partially recognizing the target or the driver is recognizing the target in accordance with a length of time during which the determination points are located within the visual field range,
cause a notification device to perform a notification in a first form of the presence of the target determined not to be recognized by the driver, and
cause the notification device to perform a notification in a second form of the presence of the target determined to be partially recognized by the driver.

10. The recognition device according to claim 9,
wherein the processor is configured to:
cause the notification device to end the notification related to the target in a case where the driver is recognizing the target for which the notification of the presence thereof has been provided.

11. The recognition device according to claim 1,
wherein the processor is configured to:
assign a recognition state of the driver to each target, record the assigned recognition state for a predetermined time period, and determine that recognition of the target to which the recognition state is assigned is in progress in a case where there are a plurality of targets in the visual field range.

12. A recognition method using a computer comprising:
recognizing a visual field range which extends from a viewpoint of a driver of a moving object in a line-of-sight direction and extends at a predetermined angle as moving away from the viewpoint with reference to a detection result of a line-of-sight detection device;
recognizing a target present in a surrounding environment of the moving object shown within image data on the basis of the image data in which surroundings of the moving object are imaged by a visual sensor disposed in the moving object and setting an area of the recognized target in a predetermined shape; and
setting a plurality of determination points in the area of the target and determining whether or not the driver is recognizing the target on the basis of a degree of overlap between the plurality of determination points and the visual field range,
wherein the plurality of determination points include at least one determination point in the area of the target and at least two determination points on a boundary of the area of the target.

13. A computer-readable non-transitory storage medium storing a program for causing a computer to:
recognize a visual field range which extends from a viewpoint of a driver of a moving object in a line-of-sight direction and extends at a predetermined angle as moving away from the viewpoint with reference to a detection result of a line-of-sight detection device;
recognize a target present in a surrounding environment of the moving object shown within image data on the basis of the image data in which surroundings of the moving object are imaged by a visual sensor disposed in the moving object and set an area of the recognized target in a predetermined shape; and
set a plurality of determination points in the area of the target and determine whether or not the driver is recognizing the target on the basis of a degree of overlap between the plurality of determination points and the visual field range,
wherein the plurality of determination points include at least one determination point in the area of the target and at least two determination points on a boundary of the area of the target.

* * * * *